US007324465B2

(12) United States Patent
Lim et al.

(10) Patent No.: US 7,324,465 B2
(45) Date of Patent: Jan. 29, 2008

(54) RANDOM ACCESS CHANNEL ACCESS APPARATUS FOR MOBILE SATELLITE COMMUNICATION SYSTEM AND METHOD THEREFOR

(75) Inventors: Kwang-Jae Lim, Taejon (KR); Soo-Young Kim, Taejon (KR); Ho-Jin Lee, Taejon (KR); Moon-Hee You, Taejon (KR)

(73) Assignee: Electronics and Telecommunications Research Institute (KR)

( * ) Notice: Subject to any disclaimer, the term of this patent is extended or adjusted under 35 U.S.C. 154(b) by 973 days.

(21) Appl. No.: 10/399,330

(22) PCT Filed: Oct. 17, 2001

(86) PCT No.: PCT/KR01/01746

§ 371 (c)(1),
(2), (4) Date: Apr. 15, 2003

(87) PCT Pub. No.: WO02/39622

PCT Pub. Date: May 16, 2002

(65) Prior Publication Data

US 2004/0014452 A1    Jan. 22, 2004

(30) Foreign Application Priority Data

Oct. 17, 2000    (KR) ............................... 2000-60961

(51) Int. Cl.
*H04Q 7/00*    (2006.01)
(52) U.S. Cl. ...................... 370/278; 370/329; 370/347

(58) Field of Classification Search ................ 370/310, 370/316, 336, 441, 447, 508, 328, 329, 278, 370/341, 337, 347, 442, 335
See application file for complete search history.

(56) References Cited

U.S. PATENT DOCUMENTS

| 6,078,572 | A | * | 6/2000 | Tanno et al. | 370/335 |
| 6,163,533 | A | * | 12/2000 | Esmailzadeh et al. | 370/342 |
| 6,859,445 | B1 | * | 2/2005 | Moon et al. | 370/335 |
| 2001/0026543 | A1 | * | 10/2001 | Hwang et al. | 370/335 |

FOREIGN PATENT DOCUMENTS

| GB | 2346779 A | * | 8/2000 |
| JP | 2001-69576 | | 3/2001 |
| JP | 2001-204072 | | 7/2001 |
| KR | 1999-84349 | | 12/1999 |
| KR | 2000-14424 | | 3/2000 |
| KR | 2000-38285 | | 10/2000 |

* cited by examiner

*Primary Examiner*—John Pezzlo
(74) *Attorney, Agent, or Firm*—Blakely, Sokoloff, Taylor & Zafman

(57) ABSTRACT

The present invention relates to Random Access Channel (RACH) access apparatus for mobile satellite communication system and method therefor. The method for accessing random access channel (RACH) on satellite system, random access channel (RACH) carrying message from a plurality of mobile stations to the satellite system, the method includes the steps of: receiving preamble and the message, the message successively transmitted with the preamble from the plurality of mobile stations; and transmitting acquisition response signal corresponding to the preamble or the message to the plurality of mobile stations. Accordingly, success of packet reception of satellite system is improved and transmission delay is reduced.

57 Claims, 7 Drawing Sheets

US 7,324,465 B2

RANDOM ACCESS CHANNEL ACCESS APPARATUS FOR MOBILE SATELLITE COMMUNICATION SYSTEM AND METHOD THEREFOR

The present patent application is a non-provisional application of International Application No. PCT/KR/01/01746, filed Oct. 17, 2001.

TECHNICAL FIELD

The present invention relates to a random access channel (RACH) access apparatus which is used when a mobile station having a characteristic of bursty transmission needs to transmit a short message without a prior radio link establishment in a code division multiple access (CDMA) satellite mobile communication system, and the method therefor.

BACKGROUND ART

A random access channel (RACH) is a channel used for transmitting a short message over one or two frames in uplink. The channel structure of the RACH and the RACH access process are disclosed in the 25.211 and 25.214 of the Technical Specification (TS) of the Third Generation Partnership Project (3GPP).

The RACH is an uplink transmission channel in which signals are always received from the entire cell. The RACH features a collision risk and an open loop power control.

Data packets of a medium length around 50 frames at largest are transmitted through a common packet channel (CPCH), and data of over 50 frames such as voice data are transmitted through a dedicated channel.

In case of a terrestrial mobile communication system for International Mobile Telecommunication-2000 (IMT-2000), a mobile station transmits a preamble to an access network through a random access channel (RACH) before sending out a message.

If any acquisition indicator signal of the transmitted preamble does not arrive from the access network within a predetermined time, the mobile station increases transmission power, retransmits the preamble and waits for the acquisition indicator signal from the access network again.

When the mobile station that has transmitted the preamble to the access network receives the acquisition indicator signal from the network within the predetermined period, it finally sends out the message. In short, an acquisition indication procedure for the preamble reception is performed before a message is transmitted.

Also, it can be checked out by the mobile station whether or not the transmitted message is received in the access network without error after receiving a response for the message—not an acquisition indicator signal of the message but a response signal of the message content—from the access network. To transmit the response to the message to the mobile station, it should be processed in the upper layers of the access network and it takes time to do it.

There are a couple of problems and requirements to apply the RACH access method of the terrestrial mobile communication system to a satellite mobile communication system.

First, since propagation delay time in the link between a mobile station and an access network is generally less than 1 ms in the terrestrial mobile communication system, the waiting time for an acquisition indicator signal after transmitting a preamble is short. Therefore, in the terrestrial mobile communication system, a preamble is sent out prior to a message, and after acknowledging the preamble, the message is transmitted. This way, the probability for a successful message transmission can be heightened.

However, in a satellite mobile communication system, the propagation delay time in the link between a mobile station and a satellite access network is more than decades or hundreds of ms, and naturally the waiting time for an acknowledge signal after the transmission of a preamble is several times of the propagation delay time. Accordingly, when the RACH access method of the terrestrial mobile communication system is applied to the satellite mobile communication system, it takes severely long time to transmit a preamble and acquire the indication on the successful reception of the preamble because of long propagation delay time. As a result, there is a problem that the message transmission delay becomes very large.

Secondly, the distance between a satellite or an earth station of the satellite access network and a mobile station in the satellite mobile communication system is much more distant than that between a base station and a mobile station in the terrestrial mobile communication system, i.e., the propagation delay is long, and thus the received power of the preamble is relatively smaller. Therefore, the probability of the successful preamble reception at the satellite access network side is very low. In addition, in case of using a low earth orbit satellite, the Doppler shift effect due to satellite movement occurs and reaches as far as tens of kHz. Therefore, in a satellite mobile communication system, there is a problem that much energy should be assigned to the preamble in order to enhance the reception probability in case of transmitting a single preamble as in the terrestrial mobile communication system.

Thirdly, in the terrestrial mobile communication system, the problem of message transmission delay is not severe even when the procedures of transmitting a preamble prior to a message, confirming the acquisition of the preamble, transmitting a message and receiving a response to the message—which is not an acquisition indicator signal for whether the message is received, but for the content of the message—are performed, because the link delay time between the mobile station and the base station is short.

Also, for the terrestrial mobile communication system, although the preamble and the message are transmitted together in the conventional ALOHA protocol and the response to the message is received without an acquisition indicator (AI) signal for the preamble acquisition, the message transmission delay time including the time for processing a response to a message in the upper layers in the access network does not cause any problem, thanks to short propagation delay time between the mobile station and the base station. In case of making access to the RACH in the ALOHA protocol, the mobile station transmits a message together with its preamble and knows whether the message and the preamble are successfully received at the base station without error by receiving a response to the transmitted message. Therefore, a processing time in the upper layers of the access network is required including the access network to process the response to the message from the mobile station and transmit the response to the mobile station. In short, only after the time for signaling and processing in the upper layers, which are necessary inside the network, passes, a mobile station can receive the response to the message and confirm if the message is received without error.

Therefore, in the terrestrial mobile communication system, although the message transmission delay includes the time for signaling and processing a response to the message in the upper layers, the time delayed until the mobile station receives the response to the message does not become a big problem.

However, as described above, in the satellite mobile communication system, the propagation delay time reaches tens or hundreds of ms, and the waiting time for the response to a message after the message transmission is several times of the propagation delay time. Therefore, it takes seriously long time until the preamble is acquired, the successful reception of the preamble is confirmed, and the response to the message is received.

Further, although it may be different according to environments of the mobile communication system, in general, the time for signaling and processing a response to a message is larger than the link propagation delay time. Accordingly, the link propagation delay, which is negligible in the terrestrial mobile communication system, is severe in the satellite mobile communication system.

Fourthly, in case of a mobile communication system using a slotted RACH method, where a mobile station transmits a packet through the RACH to be received in the access network within a slot, the mobile station should carefully control the packet transmission time to stay within the precision of the slot of the access network. To synchronize the reception time of a packet with a slot at the access network, the propagation delay time between the mobile station and the access network should be figured out precisely and the packet transmission time should be controlled. Therefore, before the packet is transmitted through the RACH, a transmission for slot synchronization and a feedback procedure for the synchronization between the mobile station and the access network should be performed, or the exact propagation delay time should be figured out by using a signal from an external device such as a global positioning system (GPS) and confirming the exact location of the mobile station and the satellite.

For these reason, in a satellite mobile communication system, it is preferred to simplify the synchronization of the RACH.

Fifthly, as mentioned above, since the received power of the packets at the satellite access network is deteriorated, when two mobile stations close to each other transmit packets at the same time, the satellite access network receives the packets almost simultaneously, such that the interference to each other is increased and the packet reception probability is seriously dropped. When packets transmitted from a plurality of mobile stations simultaneously are received by a satellite access network, the reception times of the packets at the satellite access network are centralized into a particular time duration, which depends on the difference of round trip delay times. Therefore, when the round trip delay time difference is very small, the reception time of packets from the mobile stations are centralized in a particular time, such that the interference to each other is increased and the packet reception probability is seriously dropped.

Finally, in case of the terrestrial mobile communication system, after transmitting a message, the mobile station will waits for a response to the message from the access network during a predetermined time, and if the access network doesn't receive the message successfully, there is a problem that it would take at least two round trip delays from the transmission time of the previous preamble for the mobile station to retransmit the preamble. This problem turns out to be more serious in the satellite mobile communication system, in which link delay time is much longer than that of the terrestrial mobile communication system.

DISCLOSURE OF INVENTION

It is, therefore, an object of the present invention to provide an apparatus and method for accessing a random access channel (RACH) to shorten transmission delay time in the RACH access process of a satellite mobile communication system.

It is another object of the present invention to provide an apparatus and method for accessing a random access channel (RACH) to enhance the satellite access network's reception probability of preambles and messages transmitted from the mobile stations It is still another object of the present invention to provide an apparatus and method for accessing a random access channel (RACH) to reduce the transmission power of the transmitted packets, while enhancing the reception probability of packets transmitted from mobile stations.

It is still another object of the present invention to provide an apparatus and method for accessing a random access channel (RACH) to shorten waiting time of the mobile station for the acknowledgement to the message that a mobile station has transmitted, by ruling out the time for signaling and processing a response to a message in the upper layers in the RACH access process of the satellite mobile communication system It is still another object of the present invention to provide an apparatus and method for accessing a random access channel (RACH) to simplify the synchronization needed for packet transmission in the satellite mobile system.

It is still another object of the present invention to provide an apparatus and method for accessing a random access channel (RACH) to reduce interference between packets as well by decentralizing the packet reception time on a frame basis, when the satellite access network receives packets from a plurality of mobile stations.

It is still another object of the present invention to provide an apparatus and method for accessing a random access channel (RACH) to shorten the waiting time of a mobile station for message retransmission by making the mobile station receive an acknowledge signal of message acquisition from the physical layer of the satellite access network, instead of a response to the message, when the satellite access network successfully receives a preamble but fails to receive the message.

Those skilled in the art will be able to easily figure out another objects and advantages of the present invention from the drawings, detailed description of the invention and claims of this specification.

In accordance with one aspect of the present invention, there is provided a method for accessing a random access channel (RACH) through a plurality of mobile stations transmit messages to a satellite access network, including the steps of: a) receiving a preamble and the message transmitted successively from the mobile station; and b) transmitting an acquisition indicator (AI) signal for the preamble and the message to the mobile station.

In accordance with another aspect of the present invention, there is provided a method for accessing a random access channel (RACH) through which a plurality of mobile stations transmit messages to a satellite access network, including the steps of: a) transmitting a preamble and the message successively to the satellite access network; b) receiving an acquisition indicator (AI) signal for the preamble or the message from the satellite access network; and c) retransmitting the preamble or the message based on the AI signal, or waiting for the response for the message.

In accordance with further another aspect of the present invention, there is provided a mobile station for accessing a random access channel (RACH) through which a plurality of mobile stations transmit messages to a satellite access network, the mobile station including: a transmission resource determination unit for selecting an access frame for transmitting a preamble having a plurality of sub-preambles, a sub-access frame among the sub-access frames into which the access frame is divided, a transmission time offset, a signature code for generating the preamble and a spreading code corresponding to the selected sub-access frame; a generation unit for modulating the preamble and the message suitable to be transmitted to the RACH by using the signature code and the spreading code determined in the transmission resource determination unit; a transceiver unit for transmitting the preamble and the message successively after the selected transmission time offset is passed from the starting point of the access frame or the sub-access frame, and for receiving acquisition indicator (AI) signals corresponding to the preamble and the message; and a transmission determination unit for determining whether to retransmit the preamble and the message or wait for a response to the message according to the received AI signals.

In accordance with still further another aspect of the present invention, there is provided a satellite access network for accessing a random access channel (RACH) through which a plurality of mobile stations transmit messages to the satellite access network, the satellite access network including: a transceiver unit for receiving a preamble and the message that are transmitted successively from the plurality of mobile stations; and an acquisition indicator (AI) signal for generating an positive AI signal including the acquisition indication information of the preamble and the message, or a negative AI signal including information that the use of the RACH through which the preamble and the message is not permitted.

In accordance with still further another aspect of the present invention, there is provided a random access channel (RACH) access apparatus of a mobile station, for accessing a random access channel (RACH) through which a plurality of mobile stations transmit messages to a satellite access network, the apparatus including: a transmission resource determination unit for selecting an access frame to be used for transmitting a preamble having a plurality of sub-preambles and a message, a sub-access frame among sub-access frames into which the access frame is divided, a transmission time offset, a signature code for generating the preamble and a spreading code corresponding to the selected sub-access frame and the selected RACH; a generation unit for modulating the preamble and the message suitable to be transmitted to the RACH by using the signature code and the spreading code determined in the transmission resource determination unit; a transceiver unit for transmitting the preamble and the message successively after the selected transmission time offset from the starting point of the access frame or the sub-access frame, and for receiving acquisition indicator (AI) signals for the transmitted preamble and the message; and a transmission determination unit for determining whether to retransmit the preamble and the message or wait for a response to the message according to the received AI signals.

In accordance with yet further another aspect of the present invention, there is provided a random access channel (RACH) access apparatus of a satellite access network, for accessing a random access channel (RACH) through which a plurality of mobile stations transmit messages to the satellite access network, the apparatus including: transceiver unit for receiving a preamble and the message that are transmitted together from the plurality of mobile stations successively; and an acquisition indicator (AI) signal for generating an positive AI signal including acquisition indication information of the preamble and the message, or a negative AI signal including information that the use of the RACH through which the preamble and the message is not permitted.

According to the present invention, a preamble and a message for the access to an RACH are transmitted successively to shorten the time delayed for packet transmission on the satellite link between the mobile station and the satellite access network.

Also, an acknowledgement signaling on the acquisition of preamble or message are processed in the physical layer of an earth station or a satellite of a satellite access network to reduce an acknowledgement waiting delay time of a mobile station.

Also, a preamble is composed of a plurality of sub-preambles to be repeated successively and transmitted to the satellite access network to enhance the reception probability of the preamble and the message in the poor reception power environment of the satellite link. At this point, the code of the last sub-preamble may be an inversed code of the preceding sub-preamble code or a conjugate code so as to distinguish the preamble from the message coming right afterwards.

Further, the repeated sub-preambles can be transmitted intermittently to heighten the power efficiency on a fading channel.

Also, to simplify the synchronization of the reception time of packet which a mobile station transmits in the satellite mobile communication system, an access frame that will become a time unit for the transmission of the preamble and the message is synchronized with the reception time of downlink control channel frame transmitted from the satellite access network towards the mobile station. Here, the length of the access frame may be set up larger than the maximum round trip delay time, and the time unit for the mobile station receiving an AI signal and for retransmitting the preamble and the message can be set up based on the access frame.

Also, in order to decentralize the reception time of preambles and messages transmitted from the mobile stations, each of the plurality of mobile stations can differentiate the packet transmission time by dividing an access frame into a number of sub-access frames.

Also, in order to decentralize the reception time of preambles and messages transmitted from the mobile stations, each of the plurality of mobile stations can differentiate the packet transmission time by setting the transmission time point of the preamble and message with a transmission time offset, which each of the multiple numbers of mobile stations selects independently, from the starting point of the access frame or the sub-access frame.

Also, a preamble AI signal can be used as a message AI signal as well to reduce the waiting time of the mobile station for an acknowledgement to the message that a mobile station has transmitted.

Also, a priority may be given according to the kind of random access message by assigning the set of an access frames available in an RACH, spreading code, probability in a persistence examination, initial message transmission power and the size of power increase step in retransmission differently, according to the kind of message.

BRIEF DESCRIPTION OF DRAWINGS

The above and other objects and features of the present invention will become apparent from the following description of the preferred embodiments given in conjunction with the accompanying drawings, in which.

MODES FOR CARRYING OUT THE INVENTION

Figure 1:
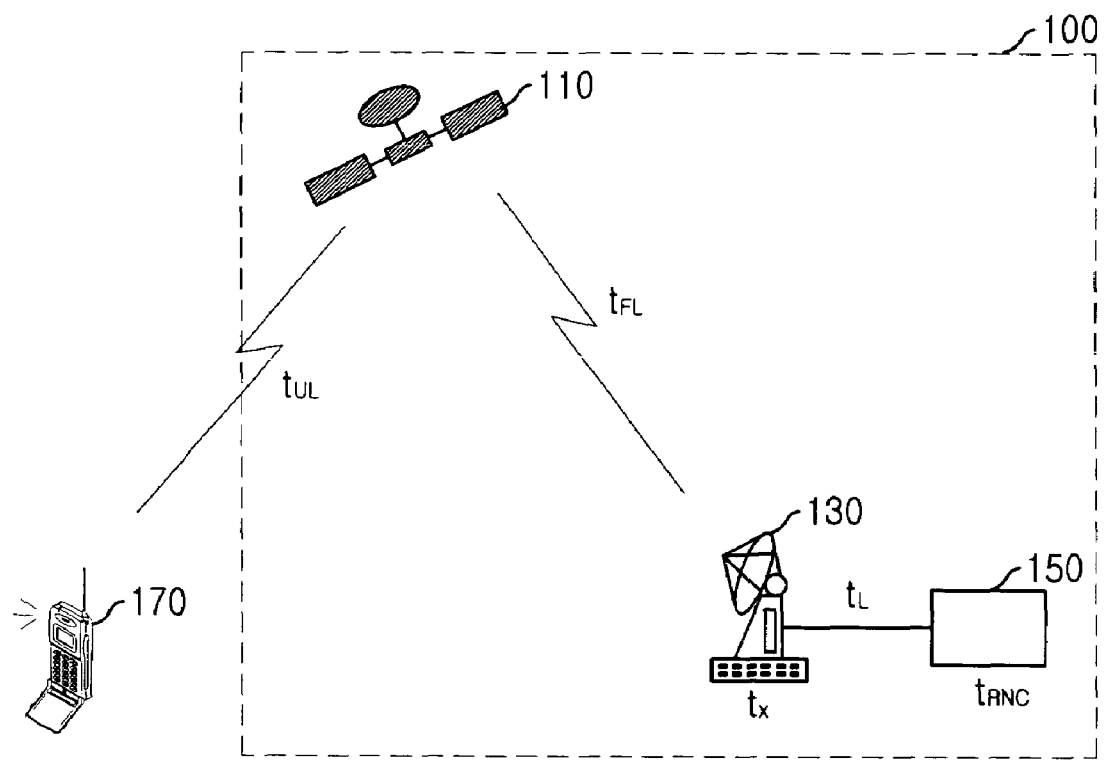
FIG. 1 is a schematic diagram of a satellite access network and a mobile station describing a satellite mobile communication environment to which the present invention is applied.

Other objects and aspects of the invention will become apparent from the following description of the embodiments with reference to the accompanying drawings, which is set forth hereinafter. First of all, attention should be paid to a point that for the same constituent, the same reference numeral has been given, although it is shown in different drawings. Also, descriptions thought to unnecessarily interrupt a correct understanding on this invention is pulled out.

FIG. 1 represents a schematic diagram of a satellite access network and a mobile station for describing a satellite mobile communication environment to which the present invention is applied.

Referring to the drawing, a satellite mobile communication environment to which the present invention is applied includes: a mobile station 170 for generating a message and transmitting a preamble and the message through a random access channel (RACH); and a satellite access network 100 for transmitting an acquisition indicator (AI) signal to the preamble and message transmitted from the mobile station 170 through a acquisition indicator channel and relaying the message to an terrestrial core network (not shown in this drawing). The satellite access network 100 includes: a control station 150 for controlling the satellite access network 100 and cooperating with the terrestrial core network; a satellite 110; and an earth station 130, thereby providing a connection between the mobile station 170 and the terrestrial core network.

Figure 2:
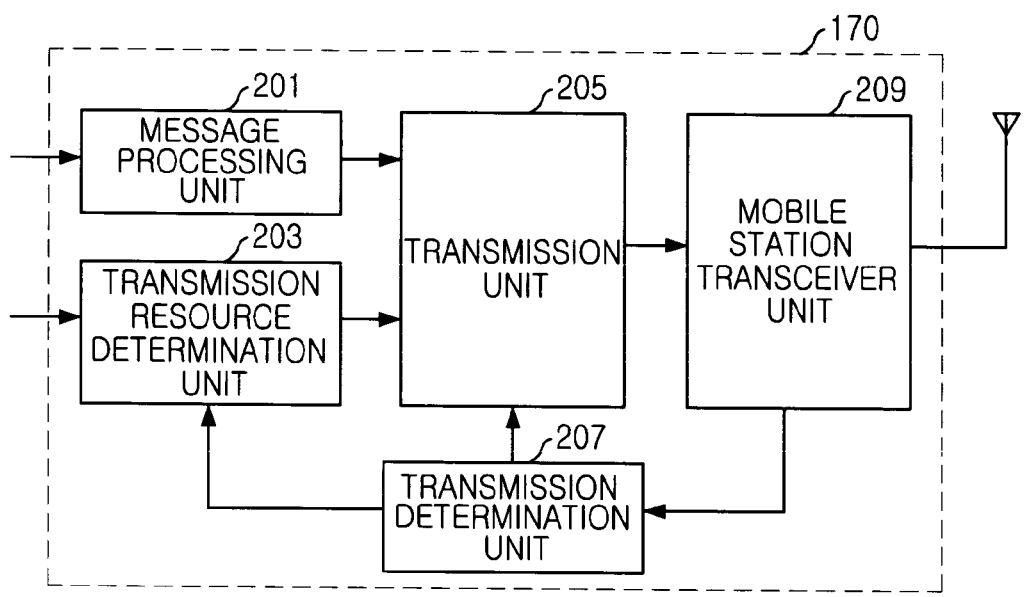
FIG. 2 is a block diagram showing a functional structure of the mobile station of FIG. 1.

FIG. 2 is a block diagram showing a functional structure of the mobile station of FIG. 1. As illustrated in the drawing, the mobile station 170 of the present invention includes a mobile station transceiver unit 209, which transmits preambles and messages to the satellite access network 100 successively during an access frame and receives a preamble AI signal, a message AI signal or a response to a message from the satellite access network 100. The mobile station transceiver unit 209 can transmit a preamble and message with a predetermined transmission offset time difference ($T_{off}$) from a starting point of an access frame or a sub-access frame, as will be described later.

Also, the mobile station 170 includes a message processing unit 201 for converting user data into message so as to transmit them through the RACH.

Also, the mobile station 170 of the present invention further includes a transmission resource determination unit 203 for selecting a parameter needed to access the RACH, such as a signature code for generating preambles and an access frame for transmitting the preambles and the messages. The transmission resource determination units 203 of all mobile stations trying to access the RACH in the present invention selects the access frame and the sub-access frame independently, and the access frame is set larger than the maximum difference of the round trip delay time between the mobile station 170 and the satellite access network 100.

Also, the mobile station 170 generates a preamble by using a signature code in accordance with the present invention, and includes a transmission unit 205 for receiving message from the message processing unit 201 and demodulating them into the signal suitable for the RACH. Accordingly, the transmission unit 205 includes a preamble generator and a packet spreader.

Finally, the mobile station 170 includes a transmission determination unit 207 for determining whether a preamble and a message should be retransmitted based on an acquisition indicator signal received by the mobile station transceiver unit 209 from the satellite access network 100. When an acquisition indicator signal is not received from the satellite access network 100, the transmission determination unit 207 activates the transmission resource determination unit 203 and the transmission unit 205 to increase the power and retransmit the preamble or the message until the acquisition indicator signal is received or the number of retransmissions reaches a predetermined maximum value. The transmission determination unit 207 updates parameters related to the RACH based on the channel information acquired from the satellite access network 100 through the control channel 401 (refer to FIG. 4).

Figure 3:
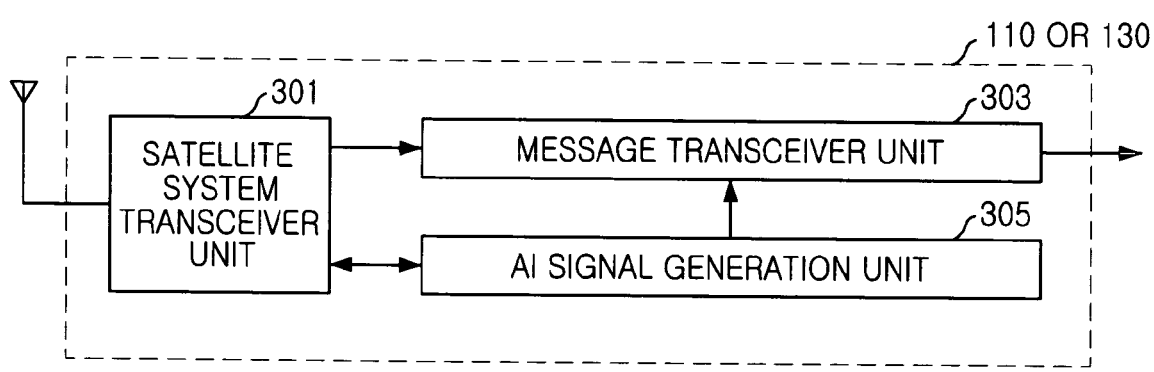
FIG. 3 is a block diagram illustrating a functional structure of a random access channel (RACH) access apparatus adopted in an earth station or a satellite of FIG. 1.

FIG. 3 is a block diagram illustrating a functional structure of a random access channel (RACH) access apparatus adopted in an earth station or a satellite of FIG. 1.

A random access channel (RACH) access apparatus for the satellite access network 100 of the present invention can be embodied in the satellite 110 or the earth station 130. As shown in the drawing, the RACH access apparatus includes a satellite system transceiver unit 301 for receiving preambles and messages transmitted from a plurality of mobile stations and transmitting AI signals and responses of the messages to the mobile stations; and a message transceiver unit 303 for relaying message to the earth network.

Meanwhile, the RACH access apparatus further includes an acquisition indicator (AI) signal generation unit 305 for generating AI signals to the preambles and messages received from the satellite system transceiver unit 301 in accordance with the present invention.

In this invention, in the reverse uplink from the mobile station 170 to the satellite access network 100, there can be one or more than one random access channels (RACHs) 405 and 409. In the forward downlink from the satellite access network 100 to the mobile station 170, there is a control channel 401 and one or more than one acquisition indicator channels 403 and 407.

The satellite access network 100 broadcasts system information and parameters for other channels as well as the RACH, through the control channel 401 (refer to FIG. 4) to the mobile station 170. The mobile station 170 receives parameters related to the access to the RACH 405 or 409, and transmits a preamble for the access to the RACH 407 and a message 425 to the satellite access network 100, using the parameters transmitted through the downlink control channel 401.

The satellite access network 100 that has received the preamble 415 and the message 425 transmits AI signals 423 and 433 of the preamble and the message to the mobile station 170 through the acquisition indicator channels 403 and 407.

Figure 4:
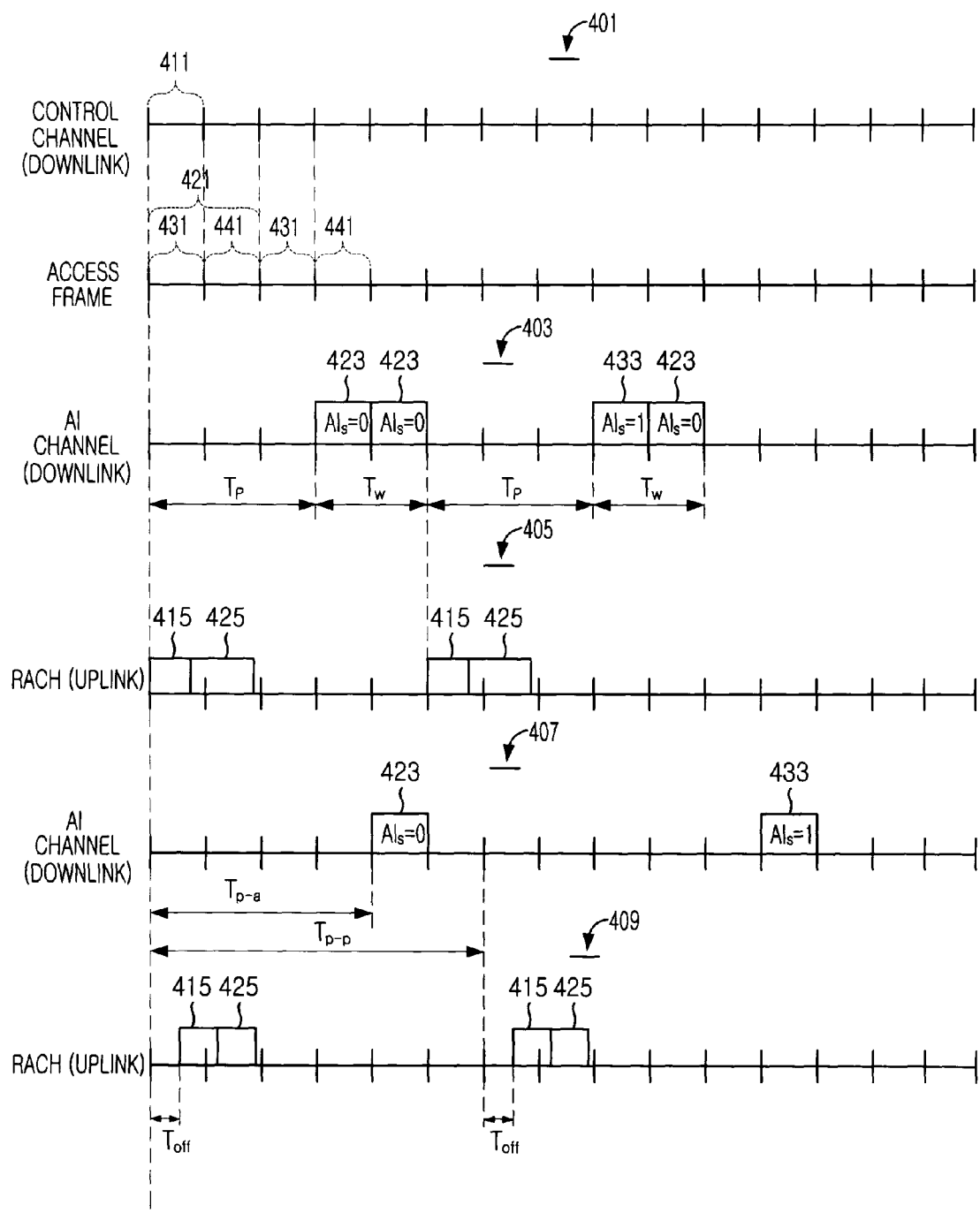
FIG. 4 is a timing diagram of a frame and a packet describing an RACH access method in accordance with an embodiment of the present invention.
Figure 5:
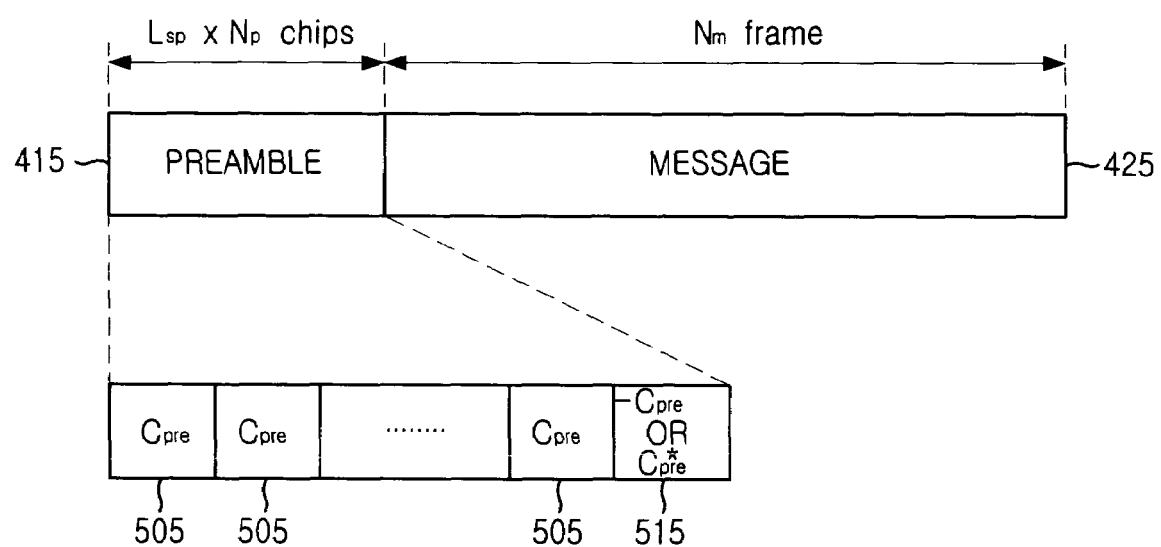
FIG. 5 is a structural diagram of a preamble and a message describing the RACH access method in accordance with an embodiment of the present invention.
Figure 6:
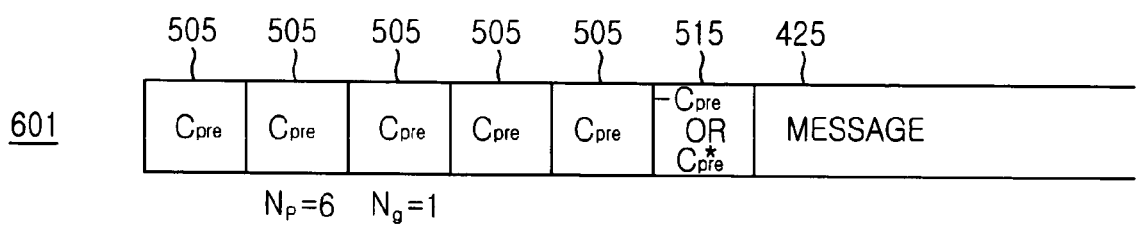
FIG. 6 is a structural diagram of a preamble describing an intermittent transmission of a sub-preamble in accordance with an embodiment of the present invention.
Figure 6:
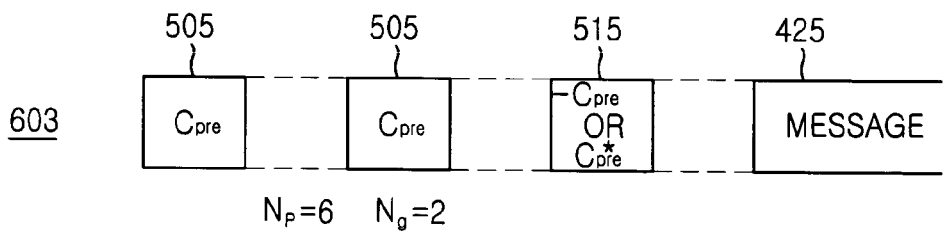
Figure 6:
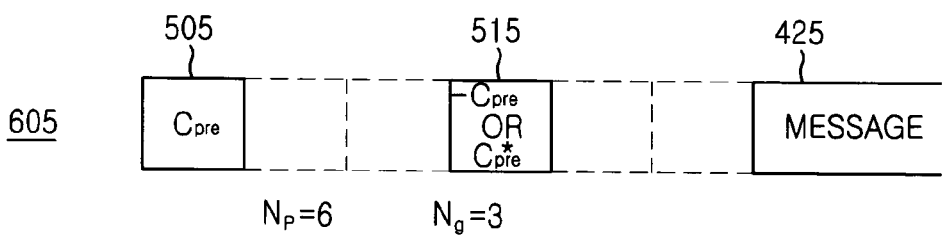

FIG. 4 is a timing diagram of a frame and a packet describing the RACH access method in accordance with an embodiment of the present invention, and FIG. 5 is a structural diagram of a preamble and a message describing the RACH access method in accordance with an embodiment of the present invention. FIG. 6 is a structural diagram of a preamble describing an intermittent transmission of a sub-preamble in accordance with an embodiment of the present invention.

Referring to FIG. 4, the mobile station 170 within the service coverage of the satellite 110 synchronizes the time points of the access frame 421, which is a time interval of the access channel, with the sub-access frames 431, 441 based on the reception time of the downlink radio frame 411, a time interval of a control channel 401 transmitted from or through the satellite 110.

In the satellite mobile communication system employing an asynchronous CDMA method, the transmission time point of each mobile station should be exactly controlled so that the earth station (just in case a satellite simply plays the role of amplifying and relaying the signal) or the satellite (in case a satellite plays the role of the transceiver of the satellite access network) can receive packets transmitted from the mobile stations through the RACH within the precise of a slot. This slot-based RACH access method should include the procedures for measuring the link path delay and controlling the transmission time. To simplify the additional procedure of controlling the reception time point in the satellite or the earth station, that is required in the conventional slot-based RACH access method, each mobile station 170 sets its transmission time point of a preamble 415 and a message 425 based on the radio frame 411 received from the satellite access network 100, instead of controlling the reception time point at the satellite or the earth station into a certain slot time.

In the present invention, the access frame instead of the slot is used for a time unit of the RACH transmission. The access frame includes multiple slots and has a longer length than the slot. The length of the access frame 421 should be set larger than the maximum difference of the round trip delays of two mobile stations 170 located in different places of a spot beam coverage of the satellite 110.

The distances between the satellite 110 and the mobile stations 170 at different locations can be different respectively. Accordingly, preambles 415 and messages 425 transmitted by the mobile stations at different locations are received in the satellite access network 100 with a time difference as much as the round trip delay difference between the mobile stations 170.

Further, when receiving AI signals of the preamble 415 and the message 425 from the satellite access network 100, each of the mobile stations 170 receives the AI signal with a time difference as much as the round trip delay difference between the mobile stations 170.

Therefore, in case of controlling the packet transmission time of the mobile station 170 into the time unit of the access frame 421 in accordance with the present invention, the length of the access frame 421 can be set larger than the maximum difference of the round trip delay time in a satellite spot beam.

In short, the length of the access frame 421 can be set larger than the maximum difference of the round trip delay time so as to be able to determine whether the packets the satellite access network 100 receives are transmitted based on the same access frame 421, or they are transmitted based on different access frames 421.

The satellite access network 100 determines the time point of the access frame 421 to be used for transmitting AI signals 423 or 433, based on the access frame 421 in which the satellite access network 100 received the packet. Each mobile station 170, also, determines the time point of the access frame in which the AI signal 423 or 433 to the preamble and message it has transmitted will be transmitted by the satellite access network 100, according to the time point of the access frame 421 in which it has transmitted.

At this point, FIG. 4 is illustrating an embodiment in which the RACH 409 is composed of access frames twice as long as the radio frame 411. That is, the drawing is showing a case where the length of the access frame 421 is twice the length of a radio frame 411. This case means that the maximum difference of the round trip delay in a spot beam of the satellite 100 is longer than the time length of the radio frame 411 and shorter than that of two radio frames 411.

The length of the access frame 421 can be set in integer multiples of the radio frame 411 for the sake of convenience in control. That is, it is set in a length n time(s) the radio frame 411, n being an integer that satisfies the following Equation (1).

$$(n-1) \times T_f < \Delta D_{max} + T_{proc} < n \times T_f \quad \text{Eq. (1)}$$

In Equation (1), $T_f$, $\Delta D_{max}$ and $T_{proc}$ denote the duration of a radio frame (i.e., radio frame length), the maximum difference time of round trip delay in a spot beam and the processing time required for the reception and transmission of related signals, respectively.

However, it is obvious to those skilled in the art of the present invention that the determination of a radio frame 411 and an access frame 421 described in the drawing can be varied according to the satellite mobile communication environments and system designs. Accordingly, the present invention is not limited to the method of determining the radio frame 411 and the access frame 421 as described in the drawing.

If the maximum difference of round trip delay is smaller than the radio frame 411, the packet transmission time unit of an RACH can be set in a radio frame 411 instead of an access frame 421.

As described above, the access frame 421 is longer than the radio frame 411, the access frame 421 can be divided into several sub-access frames 431, 441. In case that the access frame 421 is an n (n being an integer) multiple of the radio frame 411, n number of sub-access frames can be set in a single access frame 421.

A mobile station 170 selects an access frame 421 and one of the sub-access frames 431 and 441 within the access frame 421, and transmits the preamble 415 and the message 425 based on the selected sub-access frame 431 or 441. In this case, a spreading code ($S_{pre, i}$) corresponding to the sub-access frame 431 or 441 of the RACH 409 can be set differently. In other words, the spreading code corresponding to the sub-access frame 431 of the RACH 409 selected by the mobile station 170 is different from that corresponding to the sub-access frame 441. Accordingly, it becomes possible for the satellite access network 100 to distinct preambles 415 and messages 425 transmitted at the different sub-access frames 431 and 441 thanks to different spreading codes.

Further, the transmission time point of a preamble 415 and a message 425 can be set to be offset as much as the transmission offset time ($T_{off}$ [chip]) from the starting point of the sub-access frames 431, 441 the mobile station has selected. The transmission offset time ($T_{off}$) is a value the mobile station 170 randomly selects from $-T_{off,max}$ [chip] determined by a predetermined maximum transmission offset time to $T_{off,max}$ [chip].

As shown above, the preamble 415 and message 425 are transmitted based on the sub-access frame 431, 441 and the transmission offset time ($T_{off}$). The reason is that if mobile stations 170 located closed to each other transmit preambles 415 and messages 425 at a time point of the same access frame 421, the satellite access network 100 would receive the preambles 415 and messages 425 almost at the same time point, thereby generating interference between packets.

When preambles 415 and messages 425 are transmitted from a plurality of mobile stations 170 based on the starting point of the same access frame 421 and received by the satellite access network 100, they can be centralized into a particular time duration. The centralized time duration depends on the difference of a round trip delay time. Accordingly, in case that the round trip delay time difference is very shorter than the time length of the access frame 421, the preambles 415 and messages 425 are centralized into a corresponding time duration and a serious interference can be caused.

Therefore, according to the present invention, the interference can be prevented by decentralizing the transmission time points of the preambles 415 and messages 425 by the transmission offset time ($T_{off}$) and the sub-access frames 431, 441 selected by each of the mobile stations 170.

Referring FIG. 4, the RACH 405 is illustrating a case where a mobile station transmits a preamble 415 and a message 425 without consideration of the access frame 421, the sub-access frame 431 or 441 and the access offset time ($T_{off}$) On the other hand, the RACH 409 is showing a case where a preamble 415 and a message 425 are transmitted in consideration of the access frame 421, the sub-access frame 431 or 441 and the access offset time ($T_{off}$).

Meanwhile, in case that the transmission offset time ($T_{off}$) is used as a standard of a packet transmission time point in accordance with the present invention, Equation (1) is modified into the following Equation (2), in which the maximum initial transmission offset time is considered, because there exists time gap between the $-T_{off,max}$ to $T_{off,max}$ as well as the maximum difference of a round trip delay in the reception time point at the satellite access network 100.

$$(n-1) \times T_f < \Delta D_{max} + T_{proc} + 2 \times T_{off,max} < n \times T_f \qquad \text{Eq. (2)}$$

Meantime, referring to FIGS. 4 and 5, a data packet transmitted from a mobile station 170 to a satellite access network 100 through an RACH 405 or 409 consists of a preamble 415 that is inserted to make message reception 15 easy and a message 425 that contains the actual information to transmit. The message 425 is what data is spreaded by a spreading code ($S_{pre,i}$) that corresponds to the sub-access frame 431 or 441 which the mobile station 170 has selected in the RACH 405 or 409 to transmit.

Referring to FIG. 5, the preamble 415 is composed of $N_p$ number of sub-preambles 505, 515, each sub-preamble 505 or 515 being as long as an $L_{SP}$ chip. Each sub-preamble 505 or 515 is expressed as Equation (3) by a spreading code $S_{pre,i}$ of a corresponding RACH 405 or 409 i, and a signature code $C_s$ for distinguishing preambles transmitted from different mobile stations 170. Here, the spreading code is composed of $L_{sp}$ chips which is the same as the length of the sub-preamble 505 or 515. The length of the spreading code is an integer multiple of the length of the signature code, $L_{sig}$ chips, so that the signature code could repeat in the sub-preambles 505, 515. Accordingly, in case that a signature repeats $N_{sig}$ time(s) in the length of each sub-preamble, the relation can be expressed as $L_{SP} = N_{sig} \times L_{sig}$.

$$C_{pre}(k) = S_{pre,i}(k) * C_s(k \bmod L_{sig}), k=0,1,2,\ldots,L_{SP}-1 \qquad \text{Eq. (3)}$$

In Equation (3), $C_{pre}$ denotes a sub-preamble code generated by the $s^{th}$ signature code Cs and a spreading code $S_{pre,i}$ corresponding to a sub-access frame i 431 or 441 that the mobile station 170 has selected in the RACH 405 or 409. Each chip of a code has a value of 1 or −1.

Also, k mod $L_{sig}$ denotes a remainder obtained when k is divided by $L_{sig}$.

The signature code $C_s$ is a sequence composed of a plurality of symbols modulating spreading codes, which is used for the preambles of the RACHs 405, 409. When using the signature, the satellite access network 100 can acquire the preambles transmitted from a plurality of mobile stations with different signatures if different signatures are orthogonal to each other (therefore, for preambles, too). Generally, a signature is composed of sequences each of which is independent from each other, and for the signatures hadamard sequences can be used.

To enhance the probability of acquiring preambles 415 in the satellite access network 100, a sub-preamble is repeated $N_p$ time(s), and the first $N_p-1$ sub-preambles 505 are all composed of the same code $C_{pre}$ while the last sub-preamble 515 includes an inversed code $-C_{pre}$ or a conjugate code $C_{pre}^*$.

The sub-preamble $C_{pre}^*$ 515 containing a conjugate code can be embodied by the conjugate code $S_{pre,i}^*$ of the spreading code $S_{pre,i}$ that is used in the previous preamble $C_{pre}$ 505 and corresponds to a sub-access frame 431 or 441 selected by the mobile station 170 in the RACH 405 or 409.

An available signature code is defined in advance according to the RACH 405 or 409 the mobile station is accessing to, and the mobile station 170 selects one signature code among the signature codes that correspond to the RACH 405 or 409.

For example, 16 signature codes may be set corresponding to 16 RACHs. Also, it is possible to set four signature groups. Each of four signature groups includes four signature codes, and is mapped to one of four RACHs. Here, the signature groups may or may not be composed of the same signature codes. The mapping relation of the RACH and the signature code is up to the choice of a system designer.

One RACH 405 or 409 of RACH groups is selected in the upper layer according to the class of the message 425 the mobile station 170 is transmitting. The RACH 405 or 409 can be selected differently according to the class of the message. Also, several classes may use the same RACH.

However, it is obvious to those skilled in the art of the present invention that the number of times of sub-preamble 415 repetition, the distinction/selection of classes and the setup of a signature code as illustrated in the drawing can be changed variously according to the satellite mobile communication environment and the system designer. Therefore, this invention should be understood not limited to the repetition number of a sub-preamble 415, the distinction/selection of classes and the setup of a signature code as described in the drawing.

The probability of acquiring a preamble 415 in the satellite access network 100 is increased as the sub-preamble repetition number $N_p$ of the sub-preamble 505 in the preamble 415 increases. The last sub-preamble 515, an inversed sub-preamble $-C_{pre}$ or a conjugate preamble $C_{pre}^*$, informs that the next data is a message 425. Therefore, although the first sub-preamble 505 of the preamble 415 is not acquired at the time of initial reception, it can be still acquired in the next coming sub-preambles 505. The acquisition of preamble can be started at any sub-preamble 505 in the continuum of the sub-preambles 505, and the terminating point of the preamble 415 and the starting point of the message 425 can be known by the last sub-preamble 515.

When the energy required for a successful transmission of a preamble is said to be E, the whole energy E should be assigned to a single preamble when the sub-preamble is not repeated.

However, when a preamble 415 is divided into $N_p$ number of sub-preambles 505, 515 as in the present invention, each of the sub-preambles should be assigned with an energy of $E/N_p$. Accordingly, when the instantaneous interference from other RACH transmissions and other channels can be reduced, and the signal to interference ratio of the whole preamble can be enhanced even if the same energy is used. Therefore, the capability for acquiring a preamble 415 can be enhanced.

Meanwhile, in general, signals received in the satellite mobile communication environment go through fading, in which power changes as time passes by. In the fading environment, instead of transmitting the sub-preambles 505, 515 continuously as this invention previously instructs, the mobile station can transmit a single sub-preamble 505 or 515, which contains $E/N_p$, during the $N_g$ number of sub-preambles 505, 515 time durations according to a predefined period $N_g$ ($N_g < N_p$) as shown in FIG. 6, another embodiment of the present invention. The transmission power required for the transmission of a preamble can be reduced as shown in Equation (4).

$$E - N_g \times E/N_p = E(1 - N_g/N_p) \qquad \text{Eq. (4)}$$

The scale of fading changes according to the time, and the changing speed is in proportion to the moving speed of the mobile station 170. Sub-preambles 505, 515 close to each other experience similar scale of fading due to the time correlation of fading, while those apart from each other show no similarity in scale. For example, although the fading scale of the sub-preambles 505 positioned in the front is large, that of those 505, 515 at the back may be small. As mentioned above, the sub-preambles located close to each other have a similar fading scale, while the sub-preambles located remotely have an independent fading scale. Therefore, a diversity effect of fading can be obtained as well as increasing the efficiency of the transmission power by transmitting a sub-preamble 505 repeatedly with a predetermined time interval ($N_g$), instead of transmitting sub-preambles 505, 515 successively.

Referring to FIG. 6, sub-preambles 505, 515 are transmitted with an interval of one ($N_g=1$, see 601), two ($N_g=2$, see 603) or three ($N_g=3$, see 605) sub-preamble 505, 515 time duration during six ($N_p=6$) identical sub-preambles 505, 515 time duration. The last sub-preamble 515 has an inversed sign of the preceding sub-preamble 505 code or a conjugate code of it as described above.

Meanwhile, for the conventional random access method, it takes as much a time as obtained in Equation (5) to transmit a preamble 415 and a message 425 and receive a response of the message from the control station in the satellite mobile communication environment of FIG. 1.

$$T_1 = 2t_{UL} + 2t_{FL} + 2t_x + 2t_L + t_{RNC} \qquad \text{Eq. (5)}$$

where $t_{UL}$ denotes a propagation delay time over the link between the mobile station 170 and the satellite 110;

$t_{FL}$, a propagation delay time over the link between the satellite 110 and the earth station 130;

$t_x$, a time taken for processing packet reception and transmission in the physical layer of the earth station 130;

$t_L$, a propagation delay time between the earth station 130 and the control station 150; and $t_{RNC}$, a time for the reception and transmission of a message 425 and for processing a response to the message 425 in the control station 150. Therefore, $t_{RNC}$ includes the time for processing the response to the message 425 in the upper layers of the control station 150.

The transmission and reception of packet signals are processed in the physical layer. The AI signals 423 and 433 are processed in the physical layer, and the response to the message is processed in the upper layers.

Accordingly, in the conventional method, even though the mobile station has transmitted a message 425, if the message 425 is not received in the earth station successfully and the response to the message 425 is not transmitted to the mobile station from the control station for a predetermined waiting time $T_0$, the mobile station attempts to retransmit the preamble 415 and the message 425. So the waiting time $T_0$ should be larger than $T_1$ at least.

However, in this invention where the preamble 415 and message 425 are transmitted successively, the retransmission delay time can be saved, as the physical layer acknowledges the reception of the preamble and the message transmitted from the mobile station as soon as the preamble 415 and the message 425 are acquired before the response to the message 425 is received in the upper layer of the control station 150.

In general, a physical layer is embodied in the earth station 130. Acquiring the preamble 415 transmitted from the mobile station 170, the earth station 130 transmits an AI value ($AI_s$)(see Equation (8)), which corresponds to the acquired preamble 415, to the mobile station 170.

On the other hand, the mobile station 170 attempts retransmission instantly when the AI signal for the transmitted preamble 415 is not received. Here, the time taken until the mobile station 170 performs retransmission can be expressed as Equation (6), and compared to the case of Equation (5), the retransmission delay time can be saved more.

$$T_2 = 2t_{UL} + 2t_{FL} + 2t_x \qquad \text{Eq. (6)}$$

Further, in case that the function of the physical layer is embodied in the satellite 110, the time taken until the mobile station 170 retransmits the preamble 415 and the message 425 can be reduced remarkably as shown in Equation (7).

$$T_3 = 2t_{UL} + 2t_x \qquad \text{Eq. (7)}$$

In the above Equations (6) and (7), $t_x$ denotes a time needed for the transmission and reception of a signal in the physical layer in accordance with the embodiment of the present invention. As described above, if the AI signals 423, 433 are used to check whether the preamble 415 is acquired successfully, it means the time consumed to receive the preamble 415, generate AI signals 423, 433 when the preamble 415 is successfully received.

As another embodiment of the present invention, instead of being used to see if the preamble 415 transmitted from the mobile station 170 is received successfully, the AI signals 423, 433 can be used to check for both preamble 415 and message, whether they are received without error.

In the satellite access network 100, if the preamble 415 is not acquired successfully, the message 425 cannot be acquired, either. Therefore, in this embodiment of the present invention, the acquisition of the message 425 means that the preamble 415 also has been acquired successfully.

Therefore, without modification of the AI signal 423 or 433 which has been used for the purpose of checking if a preamble 415 has been received successfully, this invention makes it possible to inform the successful reception of a message 425 to the mobile station 170 quickly. The successful reception of the message 425 can be confirmed in the satellite access network 100 using a cyclic redundancy check (CRC) code, which is included in the message 425.

Consequently, in case of a success in the reception of a preamble 415 but failure in that of a message 425, the waiting time of the mobile station 170 for retransmission can be reduced.

In Equations (6) and (7), $t_x$ denotes a time for the transmission and reception of a signal in the physical layer in accordance with an embodiment of the present invention. As described above, in case that the AI signal 423 or 433 is used to check if the message 425 is acquired successfully, it means a time consumed to receive the preamble 415 and the ensuing message 425, and generate the AI signal 423 or 433 if the message data 425 has been received without error.

When the satellite access network 100 receives the preamble 415 and the message 425 transmitted from the mobile station 170 in the physical layer through the RACH 405 or 409, it transmits the acquisition indicator (AI) signals 423, 433 to the mobile station 170 through the acquisition indicator channels 403, 407.

As an embodiment of the AI signals 423, 433 transmitted from the satellite access network 100, the AI signals 423, 433 for the preamble 415 are expressed as Equation (8).

$$AI(k) = \sum_{S=0}^{N_S-1} AI_S \times C'_S(k), k = 0,1,2, \ldots L_{AI} - 1 \quad \text{Eq. (8)}$$

where $C_s'$ denotes a code corresponding to the signature code $C_s$, which is used in the preamble 415 transmitted from a mobile station 170, and $N_s$ is the total number of signatures. Being an acquisition indication value, $AI_s$ hold the value 1, −1 or 0 according to whether the preamble corresponding to the signature code $C_s$ is successfully received. $L_{AI}$ is the length of the AI signal 423 or 433.

Accordingly, the AI signal 423 or 433 has a value of $C_s'$ (positive acquisition indication), $-C_s'$ (negative acquisition indication) or 0 (no acquisition indication) according to the acquisition indication (AI) value.

Likewise, in case of the AI signal 423 or 433 for the message 425 of the first embodiment of the present invention described before, the acquisition indication value $AI_s$ has the value 1, −1 or 0 according to the reception of the message 425.

Therefore, the AI value $AI_s$ of the acquired preamble 415 or message 425 has the value of 1, while that of non-acquired preamble 415 or message 425 have the value of 0. The AI value $AI_s$ of 0 means that the power of the AI signal 423 for the preamble 415 or the message 425 of the signature code $C_s$ is 0. That is, the AI signal corresponding to the signature code $C_s$ for the preamble 415 or the message 425 of the signature code $C_s$ is not transmitted.

When a RACH is busy, for example, when the preamble 415 is received successfully but: the receivers for the message 425 are lack, or the system is overloaded, etc., all of the AI values or a particular set of AI values ($AI_s$) corresponding to the preamble 415 or the message 425 can be assigned with the value of −1 for system stabilization.

However, as shown in Equation (8), an AI signal with a particular structure can be changed variously according to the satellite mobile communication environment and system designer, which is well known to those skilled in the art of this invention.

Therefore, the present invention is not limited to the AI signal of a particular structure shown in Equation (8). It should be understood that one of the positive acquisition indication, which means a successful acquisition, no acquisition indication, which means a failure in packet acquisition, and the negative acquisition indication, which means the system is overload or lack of receivers for the reception of message, can be transmitted to the mobile station 170.

Meanwhile, as will be described later on, the sub-access frame 431 or 441 of the AI signal 423 or 433 that the mobile station 170 receives through the acquisition indicator channel corresponds to the sub-access frame 431 or 441 the mobile station 170 has selected for an initial transmission, the transmission of the preamble and the message. That is, it is the sub-access frame 431 or 441 in the same position. For instance, if the mobile station 170 selected a first sub-access frame 431 for initial transmission, the mobile station 170 waits until it receives acquisition indicator (AI) signal 423 or 433 in the first sub-access frame 431, which is after the preamble-AI time ($T_{p-a}$) (see 407) from the starting point of the sub-access frame 431.

In the acquisition indicator channel 403 of FIG. 4, one AI value ($AI_s$) corresponding to the preamble 415 and the message 425 transmitted through the RACH 405 or 409 is illustrated to be included in the corresponding sub-access frame 431 or .441. However, all the AI values ($AI_s$) are included in the sub-access frame 431 or 441 corresponding to the preambles 415 and messages 425 transmitted through the same sub-access frame 431 or 441 of the RACH 405 or 409, which will be further described later.

Upon acquiring the transmitted preamble 415 and the ensuing message 425 in the physical layer, the satellite access network 100 transmits AI signal 423 or 433 to the mobile station 170 and at the same time, passes the received message 425 to the control station 150. The control station 150 transmits the acquisition indicator signal to the mobile station 170 through the satellite access network 100.

Referring to FIG. 4, the RACH 405 is an embodiment of the present invention, in which the packet transmission time unit of the preamble 415 and the message 425 becomes the radio frame 411 of the control channel 401. The acquisition indicator signal of the RACH 405 is transmitted through the acquisition indicator channel 403.

In this embodiment of the present invention, as illustrated in the RACH 405 and the acquisition indicator channel 403, the mobile station 170 waits the time of $T_P$ (see 403) from the starting point of the radio frame 411, in which the preamble 415 and the message 425 are transmitted through the RACH 405, and then receives the AI signals 423, 433 through the acquisition indicator channel 403 during the next time of $T_w$ (see 403).

Here, if the AI value ($AI_s$) corresponding to the transmitted preamble 415 and the message 425 is 0, it is a case that the AI signal 423 or 433 is no acquisition indication. Since the mobile station 170 does not receive the AI signal, the mobile station 170 regards the reception of the message 425 in the satellite access network as failure and retransmits the preamble 415 and the message 425 in the next radio frame 411 immediately.

In case that the AI value ($AI_s$) corresponding to the transmitted preamble 415 and the message 425 is 1, the mobile station 170 regards the reception of the message 425 at the satellite access network as a success and waits for a response to the message from the control station 150.

In case that the AI value ($AI_s$) corresponding to the transmitted preamble 415 and the message 425 is −1, the mobile station 170 waits as long as a backoff time and attempts retransmission of the preamble 415 and the message 425.

If the reception time $T_w$ (see 403) for the AI signal 423 or 433 is longer than the radio frame 411 and one or more AI value $AI_{s,j}$ are received for a corresponding time unit, the multiple numbers of AI values $AI_{s,j}$ are combined into one AI value $AI_s$, as expressed in Equation (9). In the embodiment of the present invention, the mobile station 170 combines the received AI value ($AI_s$), when the mobile station 170 does not know exactly in what radio frame, the acquisition indicator signal for the mobile station 170 are transmitted.

$$AI_s = \begin{cases} 1, \text{ at least one } AL_{s,j} = 1 \\ -1, \text{ all } AL_{s,j} = -1 \\ 0, \text{ the others} \end{cases} \qquad \text{Eq. (9)}$$

The RACH 409 of FIG. 4 is another embodiment of the present invention, in which the packet transmission time unit of the preamble 415 and the message 425 is the access frame 421. The acquisition indicator signal of the RACH 409, is transmitted through the acquisition indicator channel 407.

The RACH 409 and the acquisition indicator channel 407 are time-aligned with each other based on the radio frame 411 of the control channel 401 and the access frame 421 is the packet transmission time unit.

The mobile station 170 waits the predetermined preamble-AI time ($T_{p-a}$) (see 407) from the starting point of the access frame 421, in which the preamble 415 and the message 425 are successively transmitted through the RACH 409, and then it receives the acquisition indicator (AI) signal 423 or 433 in the next access frame of the acquisition indicator channel 407.

In this case, the mobile station 170 waits for the AI signal 423 or 433 to be received from the starting point of the sub-access frame 431 or 441 that correspond to the sub-access frame 431 or 441 of the access frame 421 in which the latest preamble 415 and the message 425 have been transmitted.

The mobile station 170 determines whether to retransmit the preamble 415 and the message 425 according to the AI value ($AI_s$), i.e., AI signal 423 or 433.

If the AI value is 0 (no acquisition indication) or −1 (negative acquisition indication), the preamble 415 and the message 425 should be retransmitted, the mobile station 170 retransmits the preamble 415 and the message 425 in a predetermined preamble-preamble-preamble time ($T_{p-p}$)(see 407) from the starting point of the access frame 421 in which the preamble 415 and the message 425 have been transmitted right before.

At this point, in case that the mobile station 170 should retransmit the preamble 415 and the message 425, it uses the sub-access frame 431 or 441 again that correspond to the sub-access frame 431 or 441 selected for initial transmission, and then it retransmits the preamble 415 and the message 425 based on the sub-access frame 431 or 441.

The preamble-AI time ($T_{p-a}$) (see 407) and the preamble-preamble time ($T_{p-p}$) (see 407) are set larger than the sum of the maximum round trip delay and the signal processing time between the mobile station 170 and the earth station 130.

Here, the signal processing time is the time consumed to receive the preamble 415 in the satellite access network 100 (in case that the AI signal 423 or 433 is used as the acquisition indication for the preamble 415) or the time consumed to receive the preamble 415 and the message 425 (in case that the AI signal 423 or 433 is used as the acquisition indication signal 423 or 433 for the message 425), and the time consumed in the satellite access network 100 to determine if the preamble 415 or the message 425 have been received successfully.

The values of the preamble-AI time ($T_{p-a}$) (see 407) and the preamble-preamble time ($T_{p-p}$) (see 407) may be different according to the associated satellite beams. The control station 150 broadcasts through the control channel 401 used in each of the satellite beams.

The preamble-AI time ($T_{p-a}$) (see 407) and the preamble-preamble time ($T_{p-p}$) (see 407) use the access frame length as a basic unit (see 407). In FIG. 4, the values of the preamble-AI time ($T_{p-a}$) and the preamble-preamble time ($T_{p-p}$), are two and three access frames 421, respectively.

The preamble-AI time ($T_{p-a}$) and the preamble-preamble time ($T_{p-p}$) are generalized and defined as Equation (10).

Preamble-AI time ($T_{p-a}$)=(m+1)×access frame
preamble-preamble time ($T_{p-p}$)=(m+2)×access frame
where m denotes an integer satisfying the below equation:

(m×access frame)≦maximum round trip delay time+
signal processing time<[(m+1)×access frame]

Figure 7:
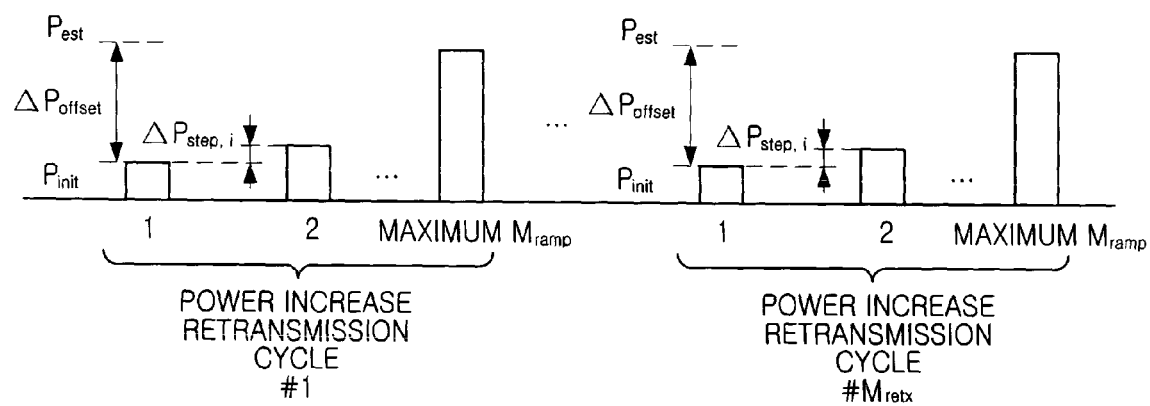
FIG. 7 is a diagram describing a power increase retransmission and a retransmission cycle in the random access channel (RACH) in accordance with an embodiment of the present invention.

FIG. 7 is a diagram describing a power increase retransmission and retransmission in a random access channel (RACH) in accordance with an embodiment of the present invention.

Before transmitting the message to the RACH 405, 409, the mobile station 170 estimates the path loss of a corresponding link based on the information on transmission power from the control channel 401 and the received power of the control channel 401 and calculates the amount of power $P_{est}$ needed for the initial RACH transmission. The actual transmission power $P_{init}$ has a difference as much as the offset power $\Delta P_{offset,i}$ from the power $P_{est}$ calculated as illustrated in FIG. 7. The power of the retransmitted preamble and message is increased as much as $\Delta P_{step,i}$ than the former transmission power, and the retransmission using the increased power can be tried out up to $M_{ramp}$ times. A retransmission period can be newly started after the power increase period. In the retransmission period, the initial transmission power is what has been recalculated from the information and the received power of the control channel in the present frame, and the retransmission can be tried out up to $M_{retx}$.

Figure 8:
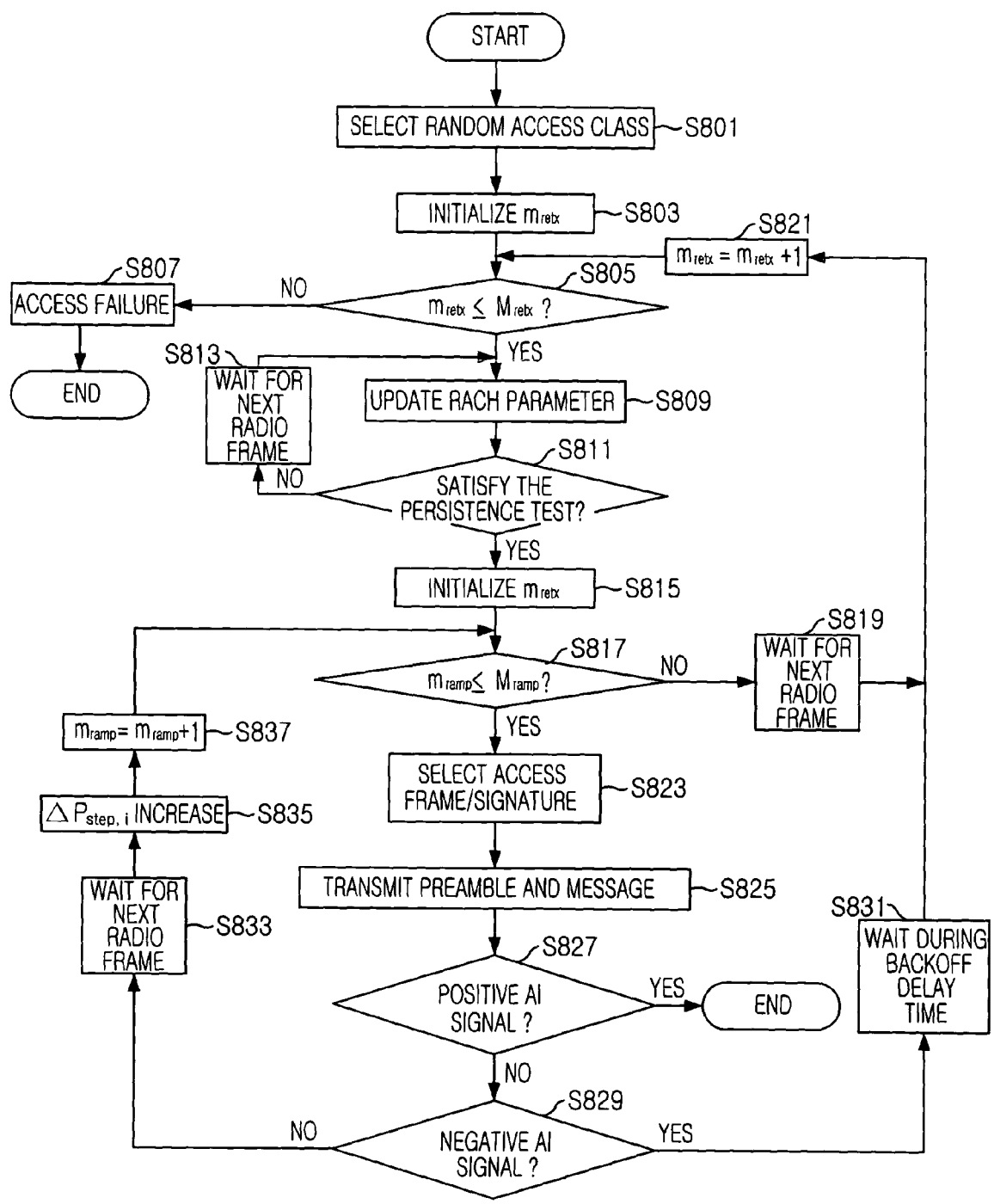
FIG. 8 is a flow chart showing the RACH access method in accordance with an embodiment of the present invention.

FIG. 8 is a flow chart showing an RACH access method in accordance with an embodiment of the present invention.

The mobile station 170 receives information on the parameters below from the satellite access network 100 through the control channel 401 before performing the RACH procedures of FIG. 8.

Among the parameters according to the RACH service class i are a set of available spreading codes $S_{pre,i}$ for the RACH 405 or 409, a set of available signature codes $C_s$ used for the RACH service class i, persistence test probability $P_i$, initial transmission power offset value $\Delta P_{offset,i}$ and transmission power incensement value $\Delta P_{step,i}$.

Also, as for common parameters, there are the maximum number of retransmission cycles $M_{retx}$, the maximum number of power increase retransmissions $M_{ramp}$, the range of maximum backoff time $T_{BO,min}$, $T_{BO,max}$, the AI signal waiting time $T_p$, the AI signal reception duration $T_w$, the waiting time for acknowledgement reception $T_R$, preamble-AI time $T_{p-a}$, preamble-preamble time $T_{p-p}$, and maximum transmission time offset $T_{off,max}$.

For the above parameters for each RACH service class, by assigning different values for different RACH service class, it is possible to differentiate reception probability of the preamble and message of different service classes.

However, parameters related to access process can be modified according to the satellite mobile communication environment and the selection of its system designer. Accordingly, it is obvious to those skilled in the art that the parameters related to the access process can be set up differently according to the satellite mobile communication environment and the system designer, and the present invention is not limited to the setup of the parameters related to access process described above.

As shown in FIG. 8, at step S801, the mobile station 170 having data to transmit initializes parameters related to the RACH 405 or 409 and selects a RACH service class according to the service type of the message.

Subsequently, at step S803, the mobile station 170 initializes the retransmission cycle counter $m_{retx}$ into 0. In the subsequent access process, the retransmission cycle can be performed as much times as the maximum number of retransmission cycles $M_{retx}$. If the retransmission cycle counter $m_{retx}$ exceeds the maximum number of retransmission cycles $M_{retx}$ ($m_{retx} > M_{retx}$) at step S805, the RACH access attempt fails at step S807. For $M_{retx}$ retransmission cycles, the parameters related to the RACH access are updated by using the parameters received through the downlink control channel in every retransmission cycle at step S809.

Subsequently, at step S811, a persistence test is performed. In the persistence test, one number between 0 and 1 is generated randomly and in case that the generated number is larger than the persistence test probability $P_i$, that is, the persistence test is not satisfied, the processing waits at step S813 the next radio frame 411, returns to S809 and repeats.

If the random number generated in the persistence test is equal to or smaller than the persistence test probability $P_i$, that is, the persistence test is satisfied at step S811, a power increase retransmission period begins and the power increase retransmission counter $m_{ramp}$ is initialized into 0 at step S815. In each retransmission cycle, the power increase retransmission can be performed as much times as the maximum number of power increase retransmissions $M_{ramp}$.

During the retransmission process except the initial transmission, if the mobile station receives a response corresponding to the message 425 that it has transmitted before, it stops the RACH access process of the present invention. This is the case that the satellite access network 100 has successfully received the message that the mobile station has transmitted through the RACH 405 or 409, and it has responded to the message through the control channel.

If the mobile station does not receive the AI signal 423 or 433 after the transmission of the preamble 415 and the message 425, it keeps retransmitting them. On the other hand, if the satellite access network 100 receives the preamble 415 and the message 425 successfully, it transmits a response to the message 425 to the mobile station 170. In this case, when the mobile station 170 receives the response to the message 425, it stops the RACH process because it achieves its goal, even if the AI signals 423, 433 are not received because of some errors.

In case that the power increase counter m.sub.ramp is larger than the maximum number of power increase retransmissions M.sub.ramp at step S817, the processing waits at step S819 the next radio frame 411, increases the retransmission cycle counter m.sub.retx by 1 at step S821 and the process for a new retransmission cycle repeats from the step S805.

In case that the power increase retransmission counter $m_{ramp}$ is smaller than the maximum number of power increase retransmissions $M_{ramp}$ at sep S817, the mobile station randomly selects a signature of the available signature set for the selected service class at step S823, and transmits the preamble 415 and the message 425 at step S825.

In accordance with an embodiment of the present invention, in case that the access frame 421, sub-access frame 431 or 441 and the initial transmission time offset $T_{off}$ are applied, the mobile station randomly selects an initial transmission time offset $T_{off}$ of the range of $-T_{off,max}$ to $T_{off,max}$ as well as a signature, an access frame and a sub-access frame at step S823.

As an embodiment of the present invention, in case that the access frame 421 is divided into a plurality of sub-access frames 431, 441, the mobile station randomly selects one of the sub-access frames 431, 441 in the current access frame. In this case, the time reference for the initial time offset is the starting time point of the selected sub-access frame 431 or 441. As described above, a spreading code $S_{Pre}$ can be set to distinguish the sub-access frame and the RACH. The satellite access network 100 broadcasts the spreading codes used for each sub-access frame and each RACH through the control channel 401. If some preambles are transmitted through the same RACH and the same sub-access frame 431 or 441, they are spread by the same spreading code.

Subsequently, after waiting as much as the preamble-AI time $T_{p-a}$ from the starting point of the access frame which is used for the transmission of the preamble 415 and the message 425, the mobile station receives the AI signal 423 or 433 on the acquisition indicator channel 403 or 407. From the received AI signal, the access status is determined (for the case that the access frame 421 and the sub-access frame 431 or 441 are applied). Or during the time of $T_w$ (see 403) after waiting as much as $T_p$ (see 403) from the starting point of the radio frame which is used for the transmission of the preamble 415 and the message 425, the mobile station receives the AI signal 423 or 433 on the acquisition indicator channel 403, and then checks the AI signal 423 or 433 from the satellite access network 100 (for the case that the access frame 421 and the sub-access frame 431 or 441 are not applied.)

Here, in case that the access frame 421 and the sub-access frame 431 or 441 are not applied, the mobile station combines the AI values $AI_{s,j}$, corresponding to the signature used for the preamble transmission through the acquisition indicator channel 403 or 407, which are received during the time duration of $T_w$ after the time of $T_p$ from the starting point of the radio frame 411 in which the preamble 415 and the message 425 were transmitted. The combined AI value $AI_s$ is determined as shown in Equation (9).

If the AI value $AI_s$ is 1 (that is, the response is positive, S827), it means that the preamble 415 (in case that the AI signal 423 or 433 is used as an acquisition indicator signal 423 or 433 for the preamble 415), or the preamble and the message (in case that the AI signal 423 or 433 is used as an acquisition indicator signal 423 or 433 for the message) is/are received in the satellite access network 100 successfully. In this case, the mobile station terminates the RACH access process, and waits for the response for the message 425 from the satellite access network 100.

The RACH access process can be started again according to the contents of the response for the-message transmitted from the satellite access network 100.

In case that the AI value $AI_s$ is −1 (that is, the response is negative, S829), the mobile station derives a backoff delay time of the range of $T_{BO,min}$ to $T_{BO,max}$, wait the derived backoff delay time at step S831, increases the retransmission cycle counter $m_{retx}$ by 1 at step S821, and repeats a new retransmission cycle from the step S805.

When the mobile station 170 does not receive any AI signals on the acquisition indicator channel 403 or 407, in other words, when the AI value $AI_s$ is 0 (i.e., a case of no response, S829), after, waiting (S833) the next radio frame 411, increasing (S835) the transmission power by $\Delta P_{step,i}$, and increasing (S837) the power increase retransmission counter $m_{retx}$ by 1, the mobile station repeats a new power increase retransmission period from the S817.

According to the present invention described above, the probability for successful packet reception is improved and the transmission delay time is reduced. Particularly, in case that the physical layer function of the satellite access network 100 is located in the earth station, or that it is located in the satellite, the waiting time for reception of the acquisition indicator signal decreases remarkably. Also, the time alignment for the RACH transmission and the AI signal between the mobile station and the satellite access network can be carried out easily, and the interference between the packets can be decreased by decentralizing the reception time of preambles and message. Further, this invention reduces the waiting time of a mobile station for reception of the acquisition indicator signal by using the preamble AI signal as a message AI signal.

While the present invention has been described with respect to certain preferred embodiments, it will be apparent to those skilled in the art that various changes and modifications may be made without departing from the scope of the invention as defined in the following claims.

What is claimed is:

1. A method for accessing a random access channel (RACH) through which a plurality of mobile stations transmit messages to a satellite access network, comprising the steps of:
    a) receiving a preamble and a message transmitted successively from the mobile station; and
    b) transmitting an acquisition indicator (AI) signal for the preamble and the message to the mobile station.

2. The method as recited in claim 1, wherein a transmission time unit of the preamble and the message is an access frame of a predetermined length on the RACH selected independently by each of the mobile stations.

3. The method as recited in claim 2, wherein the access frame is time-aligned with a radio frame of a control channel, which is broadcasted from the satellite access network in conformity with a starting point of the radio frame that each of the mobile stations receives.

4. The method as recited in claim 2, wherein the preamble and the message are transmitted based on a starting point of a sub-access frame selected independently by each of the mobile stations among a plurality of sub-access frames, the access frame being divided into a plurality of sub-access frames which have the same length.

5. The method as recited in claim 4, wherein the preamble and the message are transmitted after a transmission time offset selected independently by each of the mobile stations from the starting point of the access frame or the sub-access frame.

6. The method as recited in claim 1, wherein the AI signal is any one of:
    a positive AI signal informing of an acquisition indication of the preamble or the message; and
    a negative AI signal informing that the use of the RACH through which the preamble or the message is transmitted is not permitted currently.

7. The method as recited in claim 6, wherein the positive AI signal includes a positive acquisition indication (AI) value.

8. The method as recited in claim 6, wherein the negative AI signal includes a negative acquisition indication (AI) value.

9. The method as recited in claim 1, wherein said method for accessing the RACH is performed in a physical layer of the satellite access network.

10. The method as recited in claim 9, wherein the physical layer function is located in an earth station of the satellite access network.

11. The method as recited in claim 9, wherein the physical layer function is located in a satellite of the satellite access network.

12. The method as recited in claim 1, wherein the preamble includes N number of sub-preambles generated by a signature code of a set of signature codes used for the RACH to which the mobile station tries to access, N being an integer larger than 2.

13. The method as recited in claim 12, wherein the preamble includes:
    N−1 number of first sub-preambles having the same code; and
    a second sub-preamble which is a conjugate code of the first sub-preambles.

14. The method as recited in claim 12, wherein the preamble includes:
    N−1 number of first sub-preambles having the same code; and
    a second sub-preamble with an inversed sign of the first sub-preambles.

15. The method as recited in claim 12, wherein the preamble is composed of a continuum of the N number of sub-preambles.

16. The method as recited in claim 12, wherein the preamble is composed of the N number of sub-preambles apart in a predetermined interval intermittently.

17. The method as recited in claim 4, wherein the preamble and the message are generated by a spreading code corresponding to the selected sub-access frame in the RACH.

18. The method as recited in claim 2, wherein the access frame is larger than a maximum difference of round trip delay times between the different mobile stations and the satellite access network.

19. The method as recited in claim 5, wherein the access frame is larger than a sum of a maximum difference of round trip delay times between the different mobile stations and the satellite access network, and the twice of a maximum transmission time offset.

20. The method as recited in claim 4, wherein a length of the sub-access frame is the same as that of the radio frame broadcasted from the satellite access network on the control channel.

21. The method as recited in claim 2, wherein the AI signal for the preamble or the message is transmitted based on the access frame periodically.

22. The method as recited in claim 1, wherein the AI signal for the preamble or the message is transmitted on a time basis of a radio frame broadcasted from the satellite access network on a control channel.

23. A method for accessing a random access channel (RACH) through which a plurality of mobile stations transmit messages to a satellite access network, comprising the steps of:
   a) transmitting a preamble and a message successively to the satellite access network;
   b) receiving an acquisition indicator (AI) signal for the preamble or the message from the satellite access network; and
   c) retransmitting the preamble or the message based on the AI signal, or waiting for a response for the message.

24. The method as recited in claim 23, wherein a transmission time unit of the preamble and the message is the access frame of a predetermined length on the RACH selected independently by each of the mobile stations.

25. The method as recited in claim 24, wherein the access frame is time-aligned with a radio frame of a control channel, which is broadcasted from the satellite access network, in conformity with a starting point of the radio frame that each of the mobile stations receives.

26. The method as recited in claim 24, wherein the preamble and the message is transmitted based on a starting point of a sub-access frame selected independently by the mobile station among the plurality of sub-access frames, the access frame being divided into a plurality of sub-access frames which have the same length.

27. The method as recited in claim 26, wherein the preamble and the message is transmitted after a transmission time offset selected independently by the mobile station from the starting point of the access frame or the sub-access frame.

28. The method as recited in claim 23, wherein the preamble includes N number of sub-preambles generated by a signature code of a set of signature codes used for the RACH to which the mobile station tries to access, N being an integer larger than 2.

29. The method as recited in claim 28, wherein the preamble includes:
   N−1 number of first sub-preambles having the same code; and
   a second sub-preamble which is a conjugate code of the first sub-preambles.

30. The method as recited in claim 28, wherein the preamble includes:
   N−1 number of first sub-preambles having the same code; and
   a second sub-preamble with an inversed sign of the first sub-preambles.

31. The method as recited in claim 28, wherein the preamble is composed of a continuum of the N number of sub-preambles.

32. The method as recited in claim 28, wherein the preamble is composed of the N number of sub-preambles apart in a predetermined interval intermittently.

33. The method as recited in claim 26, wherein the preamble and the message are generated by a spreading code corresponding to the selected sub-access frame in the RACH.

34. The method as recited in claim 24, wherein the access frame is larger than a maximum difference of round trip delay times between the different mobile stations and the satellite access network.

35. The method as recited in claim 27, wherein the access frame is larger than a sum of a maximum difference of round trip delay times between the different mobile stations and the satellite access network, and the twice of a maximum transmission time offset.

36. The method as recited in claim 26, wherein a length of the sub-access frame is the same as that of the radio frame broadcasted from the satellite access network on the control channel.

37. The method as recited in claim 23, wherein the AI signal is any one of:
   a positive AI signal informing of an acquisition indication of the preamble or the message; and
   a negative AI signal informing that the use of the RACH through which the preamble or the message is transmitted is not permitted currently.

38. The method as recited in claim 23, wherein the step a) includes the steps of:
   a1) selecting a RACH access service class of the message to be transmitted;
   a2) selecting an access frame to be used for transmission of the preamble and the message, a signature code to be used for generating the preamble and a spreading code corresponding to the RACH to be accessed to; and
   a3) transmitting the preamble and the message generated by the signature code and the spreading code successively based on the access frame as a time unit.

39. The method as recited in claim 38, further including the step of:
   a4) determining if the persistence test is satisfied at or before the step a3).

40. The method as recited in claim 38, wherein if none of the positive or negative AI signal is received from the satellite access network at the step b), the step c) includes the steps of:
   c1) performing the steps a2) and a3) repeatedly by increasing the transmission power of the preamble and the message until any one of the positive AI signal and the negative AI signal is received; and
   c2) if the repetition number of the step c1) exceeds a predetermined maximum number of power increase retransmissions, performing the steps a1) to a3) repeatedly for the new retransmission period.

41. The method as recited in claim 38, wherein if the AI signal of the step b) is a positive AI signal, the step c) includes the step of: waiting for reception of a message response transmitted from the satellite access network.

42. The method as recited in claim 38, wherein if the AI signal of the step b) is a negative AI signal, the step c) includes the step of:
   performing the steps a1) to a3) repeatedly after a predetermined time.

43. The method as recited in claim 38, wherein the step a2) further includes the step of selecting any one of the plurality of sub-access frames into which the access frame is divided; and wherein the spreading code corresponds to the selected sub-access frame in the RACH to be accessed to, and in the step a3), the preamble and the message are transmitted based on the starting point of the access frame or the sub-access frame.

44. The method as recited in claim 43, wherein the step a2) further includes the step of selecting a transmission time offset; and
wherein in the step a3), the preamble and the message are transmitted after the selected transmission time offset from the starting point of the access frame or the sub-access frame.

45. The method as recited in claim 38, wherein the step a2) includes the step of:
updating the parameters related to the RACH access based on the RACH information obtained from the control channel broadcasted from the satellite access network.

46. The method as recited in claim 43, wherein in the step b), the AI signals for the preamble and the message are received after a predetermined preamble-AI time is passed from the starting point of the access frame or the sub-access frame in which the preamble and the message are transmitted in the step of a3).

47. The method as recited in claim 43, wherein in the step b), the AI signals for the preamble and the message are received after a predetermined preamble-preamble time is passed from the starting point of the access frame or the sub-access frame in which the preamble and the message are transmitted in the step of a3).

48. The method as recited in claim 47, wherein the preamble-AI time is shorter than the preamble-preamble time by as much as one access frame.

49. The method as recited in claim 46, wherein the preamble-AI time is an integer multiple of the access frame.

50. The method as recited in claim 47, wherein the preamble-preamble time is an integer multiple of the access frame.

51. The method as recited in claim 23, wherein the AI signal for the preamble or the message is transmitted based on the radio frame broadcasted from the satellite access network on the control channel.

52. The method as recited in claim 38, wherein the step a2), a persistence test probability, an initial transmission power offset and a transmission power increase value are further selected, and
wherein an available spreading code, a set of available signatures, a persistence test probability, an initial transmission power offset and the transmission power increase value are selected differently according to the RACH access service class of the step of a1).

53. The method as recited in claim 37 or 51, wherein in case that the reception time of the AI signal is longer than that of the radio frame, the step b) includes the steps of:
b1) if at least one of the plurality of AI values included in the AI signal is a positive AI value, combining all the AI signals into a positive value; and
b2) if each of the AI values included in the AI signal is either a negative AI value or a zero, combining all the AI signals into a negative value.

54. A mobile station for accessing a random access channel (RACH) through which a plurality of mobile stations transmit messages to a satellite access network, the mobile station comprising:
a transmission resource determination means for selecting an access frame for transmitting a message and a preamble having a plurality of sub-preambles, a sub-access frame among the sub-access frames into which the access frame is divided, a transmission time offset, a signature code for generating the preamble and a spreading code corresponding to the selected sub-access frame and the selected RACH;
a generation means for modulating the preamble and the message suitable to be transmitted to the RACH by using the signature code and the spreading code determined in the transmission resource determination means;
a transceiver means for transmitting the preamble and the message successively after the selected transmission time offset is passed from the starting point of the access frame or the sub-access frame, and for receiving acquisition indicator (AI) signals corresponding to the preamble and the message; and
a transmission determination means for determining whether to retransmit the preamble and the message or wait for a response to the message according to the received AI signals.

55. A satellite access network for accessing a random access channel (RACH) through which a plurality of mobile stations transmit messages to the satellite access network, the satellite access network comprising:
a transceiver means for receiving a preamble and a message that are transmitted successively from the plurality of mobile stations; and
an acquisition indicator (AI) signal for generating an positive AI signal including the acquisition indication information of the preamble and the message, or a negative AI signal including information that the use of the RACH through which the preamble and the message is not permitted currently.

56. A random access channel (RACH) access apparatus of a mobile station, for accessing a random access channel (RACH) through which a plurality of mobile stations transmit messages to a satellite access network, the apparatus comprising:
a transmission resource determination means for selecting an access frame for transmitting a message and a preamble having a plurality of sub-preambles, a sub-access frame among sub-access frames into which the access frame is divided, a transmission time offset, a signature code for generating the preamble and a spreading code corresponding to the selected sub-access frame and the selected RACH;
a generation means for modulating the preamble and the message suitable to be transmitted to the RACH by using the signature code and the spreading code determined in the transmission resource determination means;
a transceiver means for transmitting the preamble and the message successively after the selected transmission time offset from the starting point of the access frame or the sub-access frame, and for receiving acquisition indicator (AI) signals for the transmitted preamble and the message; and
a transmission determination means for determining whether to retransmit the preamble and the message or wait for a response to the message according to the received AI signals.

57. A random access channel (RACH) access apparatus of a satellite access network, for accessing a random access channel (RACH) through which a plurality of mobile stations transmit messages to the satellite access network, the apparatus comprising:

transceiver means for receiving a preamble and a message that are transmitted successively from the plurality of mobile stations; and an acquisition indicator (AI) signal for generating an positive AI signal including acquisition indication information of the preamble and the message, or a negative AI signal including information that the use of the RACH through which the preamble and the message is not permitted.

* * * * *